(12) United States Patent
Garmon

(10) Patent No.: US 11,438,545 B2
(45) Date of Patent: Sep. 6, 2022

(54) VIDEO IMAGE-BASED MEDIA STREAM BANDWIDTH REDUCTION

(71) Applicant: Carrier Corporation, Palm Beach Gardens, FL (US)

(72) Inventor: Richard W. Garmon, Mystic, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/093,856

(22) Filed: Nov. 10, 2020

(65) Prior Publication Data

US 2021/0195137 A1    Jun. 24, 2021

Related U.S. Application Data

(60) Provisional application No. 62/952,622, filed on Dec. 23, 2019.

(51) Int. Cl.
*H04N 5/917* (2006.01)
*H04N 7/14* (2006.01)

(52) U.S. Cl.
CPC ............ *H04N 5/917* (2013.01); *H04N 7/147* (2013.01)

(58) Field of Classification Search
None
See application file for complete search history.

(56) References Cited

U.S. PATENT DOCUMENTS 7,400,633 B2   7/2008  Krishnan
7,496,277 B2   2/2009  Ackley et al.
7,555,559 B2   6/2009  Chapweske
8,228,982 B2   7/2012  Qian et al.
8,249,414 B2   8/2012  Ackley et al.
8,285,250 B2  10/2012  Rubin et al.
(Continued)

FOREIGN PATENT DOCUMENTS

EP   1775953 A1   4/2007
EP   3350702 B1   4/2019
WO  15044104 A1   4/2015

OTHER PUBLICATIONS

EP Application No. 20213021.7 Extended EP Search Report dated Feb. 15, 2021, 8 pages.
(Continued)

*Primary Examiner* — Quoc D Tran
(74) *Attorney, Agent, or Firm* — Cantor Colburn LLP

(57) ABSTRACT

A video system includes one or more media sources and a media server configured to communicate with a video viewing device through a network. The media server includes memory and a processor configured to perform operations. The operations include receiving a video stream from the one or more media sources, where the video stream includes a plurality of image frames. The operations also include determining whether throttling is enabled for the video stream. Based on determining that throttling is enabled, one or more of the image frames of the video stream are dropped until a predetermined condition is met and one of the image frames from the media server is transmitted through the network to the video viewing device after the predetermined condition is met. Based on determining that throttling is disabled, the image frames are transmitted from the media server through the network to the video viewing device.

17 Claims, 5 Drawing Sheets

(56) References Cited

U.S. PATENT DOCUMENTS

| | | | |
|---|---|---|---|
| 8,646,014 B2 | 2/2014 | Macinnis | |
| 8,683,535 B2 | 3/2014 | Macinnis | |
| 8,695,047 B2 | 4/2014 | Chennupati | |
| 8,867,886 B2 | 10/2014 | Feinson | |
| 9,020,039 B2 | 4/2015 | Van Der Schaar | |
| 9,137,551 B2 | 9/2015 | Cote et al. | |
| 9,197,685 B2 | 11/2015 | Soroushian | |
| 9,363,574 B1* | 6/2016 | Ouellet | H04N 21/6373 |
| 9,379,990 B2 | 6/2016 | Lamouchi et al. | |
| 9,380,266 B2 | 6/2016 | Pai | |
| 9,450,879 B2 | 9/2016 | Rector | |
| 9,490,948 B2 | 11/2016 | Doken et al. | |
| 9,491,414 B2 | 11/2016 | Lasko | |
| 9,537,917 B2 | 1/2017 | Ramamurthy | |
| 9,704,393 B2 | 7/2017 | Acharya et al. | |
| 9,894,126 B1 | 2/2018 | Block et al. | |
| 9,954,919 B1 | 4/2018 | Khan et al. | |
| 9,967,303 B2 | 5/2018 | Eriksson et al. | |
| 10,142,381 B2 | 11/2018 | Nathan et al. | |
| 10,171,540 B2 | 1/2019 | Soffer et al. | |
| 10,353,962 B2 | 7/2019 | Choen et al. | |
| 10,404,943 B1 | 9/2019 | Fieldman | |
| 2003/0091000 A1* | 5/2003 | Chu | H04L 47/32 |
| | | | 370/230 |
| 2007/0230581 A1* | 10/2007 | Orr | H04N 19/156 |
| | | | 375/240.21 |
| 2008/0175273 A1* | 7/2008 | Johansson | H04N 21/26616 |
| | | | 370/473 |
| 2008/0291934 A1 | 11/2008 | Christenson et al. | |
| 2009/0315886 A1 | 12/2009 | Drive et al. | |
| 2010/0040134 A1 | 2/2010 | Sun | |
| 2011/0058036 A1 | 3/2011 | Metzger et al. | |
| 2011/0310217 A1* | 12/2011 | Lee | H04N 19/172 |
| | | | 348/14.08 |
| 2012/0106328 A1* | 5/2012 | Gan | H04N 21/26216 |
| | | | 370/230 |
| 2012/0303797 A1* | 11/2012 | Mathur | H04L 65/4092 |
| | | | 709/224 |
| 2013/0106980 A1 | 5/2013 | Obaidi | |
| 2013/0212227 A1 | 8/2013 | Thomas | |
| 2015/0063462 A1 | 3/2015 | Balaraman | |
| 2015/0156243 A1 | 6/2015 | Skog et al. | |
| 2015/0189225 A1 | 7/2015 | Soroushian et al. | |
| 2015/0373383 A1 | 12/2015 | Pichumani et al. | |
| 2016/0173553 A1 | 6/2016 | Panje et al. | |
| 2017/0347159 A1 | 11/2017 | Baik et al. | |
| 2018/0184138 A1 | 6/2018 | Shaw et al. | |
| 2018/0199082 A1 | 7/2018 | Shaw et al. | |
| 2018/0205802 A1 | 7/2018 | Bowen | |
| 2018/0330590 A1 | 11/2018 | Lasko | |
| 2018/0367842 A1 | 12/2018 | Macinnis | |
| 2019/0090006 A1 | 3/2019 | Travisano | |
| 2019/0347487 A1* | 11/2019 | Booth | H04N 7/181 |
| 2021/0195136 A1 | 6/2021 | Garmon | |

OTHER PUBLICATIONS

B. Carle, VMS Bandwidth Saving Technologies—Security Today, Demand for video and improved resolution continues to increase in organizations, Feb. 1, 2017, 6 pages.

Fortinet, Understanding IP Surveillance Camera Bandwidth—High Performance Multi-Threat Security Solutions, May 11, 2017, 17 pages.

India Application No. 4412 CHE 2012, Entitled: System and Method for Throttling Bandwidth While Processing Video, Applicant: Blue Coat Systems, Inc., filed Oct. 22, 2012, 35 pages.

EP Application No. 20210755.3 Extended EP Search Report dated May 3, 2021, 8 pages.

* cited by examiner

VIDEO IMAGE-BASED MEDIA STREAM BANDWIDTH REDUCTION

CROSS-REFERENCE TO RELATED APPLICATION

This application claims the benefit of priority to U.S. Provisional Application No. 62/952,622 filed Dec. 23, 2019, the disclosure of which is incorporated herein by reference in its entirety.

BACKGROUND

The subject matter disclosed herein generally relates to the field of video networks, and more particularly to an apparatus and method for video image-based media stream bandwidth reduction.

In some video display application, such as video surveillance, a client application may receive and display several video streams simultaneously. Video streamed from a video camera or a video recording device may have a high frame rate and resolution, which can consume a substantial amount of network bandwidth, memory, and processing resources when streamed over a network to a video display device. This can result in choppy and distracting video output at the video display device. Inconsistent video playback rates due to network loading can add post-processing challenges at the video display device. Further, when video bandwidth demands are high, other network traffic may experience increased latency.

BRIEF SUMMARY

According to one embodiment, a video system includes one or more media sources and a media server configured to communicate with a video viewing device through a network. The media server includes memory and a processor configured to perform a plurality of operations. The operations include receiving a video stream from the one or more media sources, where the video stream includes a plurality of image frames. The operations also include determining whether throttling is enabled for the video stream. Based on determining that throttling is enabled, one or more of the image frames of the video stream are dropped until a predetermined condition is met and one of the image frames from the media server is transmitted through the network to the video viewing device after the predetermined condition is met. Based on determining that throttling is disabled, the image frames of the video stream are transmitted from the media server through the network to the video viewing device.

In addition to one or more of the features described above, or as an alternative, further embodiments may include where the operations include tracking a time and a number of frame drops since a last frame was transmitted while throttling is enabled, where the predetermined condition is based on one or more of the time and the number of frame drops since the last frame was transmitted.

In addition to one or more of the features described above, or as an alternative, further embodiments may include where the one or more media sources provide a plurality of video streams to the media server, and throttling is selectable on a per video stream basis.

In addition to one or more of the features described above, or as an alternative, further embodiments may include where throttling is commanded in response to a throttling request received from the video viewing device.

In addition to one or more of the features described above, or as an alternative, further embodiments may include where throttling is commanded based on a status of the network.

In addition to one or more of the features described above, or as an alternative, further embodiments may include where throttling is commanded based on a status of the media server.

In addition to one or more of the features described above, or as an alternative, further embodiments may include the one or more media sources include one or more of a video camera and a video recorder.

According to another embodiment, a method of controlling a video system includes receiving, at a media server, a video stream from one or more media sources, where the video stream includes a plurality of image frames. The method also includes determining whether throttling is enabled for the video stream. Based on determining that throttling is enabled, one or more of the image frames of the video stream are dropped until a predetermined condition is met and one of the image frames from the media server is transmitted through the network to the video viewing device after the predetermined condition is met. Based on determining that throttling is disabled, the image frames of the video stream are transmitted from the media server through the network to the video viewing device.

According to a further embodiment, a computer program product is provided. The computer readable storage medium has program instructions embodied therewith, the program instructions executable by a processor of a media server to cause the processor to perform a plurality of operations. The operations include receiving a video stream from one or more media sources, where the video stream includes a plurality of image frames. The operations also include determining whether throttling is enabled for the video stream. Based on determining that throttling is enabled, one or more of the image frames of the video stream are dropped until a predetermined condition is met and one of the image frames from the media server is transmitted through the network to the video viewing device after the predetermined condition is met. Based on determining that throttling is disabled, the image frames of the video stream are transmitted from the media server through the network to the video viewing device.

Technical effects of embodiments of the present disclosure include network bandwidth reduction during video streaming over a network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

In a video surveillance application, it is not uncommon for a client application to display video from several sources simultaneously. If the client application is browser-based and media is streamed over an Internet or Intranet, and if each of the media sources natively exists at a very-high frame rate (e.g., 30 frames per second) and a high resolution (e.g., high definition, ultra-high definition, etc.), the bandwidth utilization may result in degraded performance. Transcoding of video is one approach that attempts to combine/blend video data and/or change resolution, but transcoding can be costly from a processing resource perspective. Further, rendering multiple full-frame rate, full-resolution streams can also require a large amount of client system processing resource utilization, thereby consuming resources that could otherwise be used for running other applications. Embodiments of the disclosure provide throttling support to selectively reduce video stream bandwidth requirements while also avoiding the processing burdens of transcoding.

Motion JPEG (MJPEG) is an encoding technique in which a video stream includes a series of separate JPEG images. Unlike other encoding techniques, such as H.264, each frame of an MJPEG video stream is a fully encapsulated and independent JPEG image that can be rendered without any dependence on information contained in any previous frame. HTML5 supports a <canvas> element upon which web browser-based client applications can draw images/graphics. The canvas natively supports the rendering of JPEG images. Through successive JPEG image rendering, MJPEG encoded video can be displayed through an application, such as a web browser.

Figure 1:
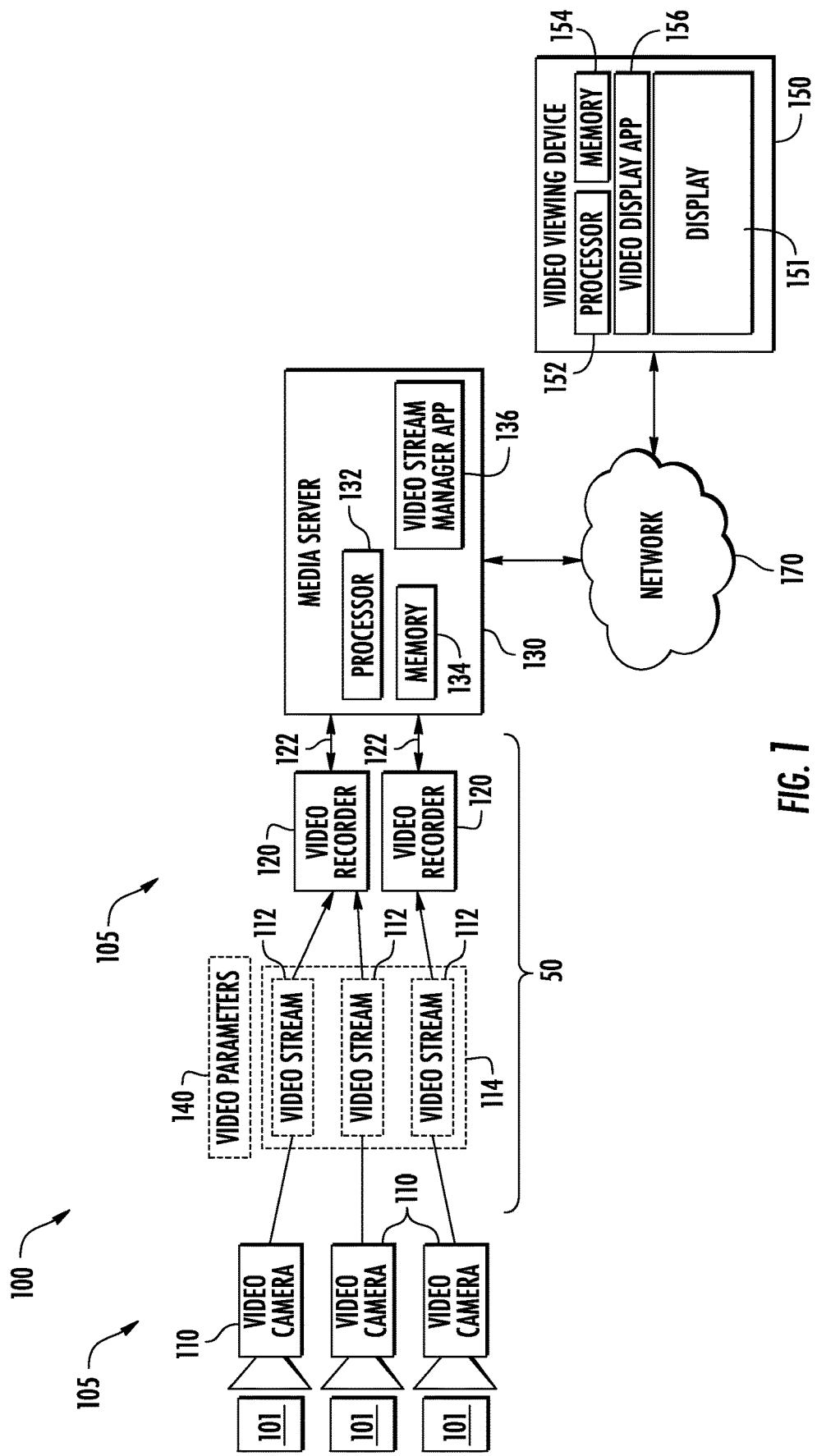
FIG. 1 illustrates a general schematic system diagram of a video system, in accordance with an embodiment of the disclosure.

FIG. 1 schematically illustrates a video system 100, in accordance with an embodiment of the present disclosure. It should be appreciated that, although particular systems are separately defined in the schematic block diagrams, each or any of the systems may be otherwise combined or separated via hardware and/or software. The video system 100 may include one or more media sources 105, such as one or more video cameras 110 and/or one or more video recorders 120. Each of the video cameras 110 may be positioned to capture video streams 112 of an area 101, for instance, as part of a surveillance system. The areas 101 of each camera 110 may overlap with areas of other video cameras 110 either partially or in full. Each video camera 110 may be adjustable to be repositioned to capture the same area 101 or multiple areas 101. Alternatively, one or more of the areas 101 can be at different geographic locations. The video recorders 120 can store video streams 112 from the video cameras 110 or video captured and/or processed from one or more different sources. Each of the video recorders 120 can capture video streams 112 from one or more of the video cameras 110.

The video system 100 can include a media server 130 that interfaces with one or more video viewing devices 150 through a network 170. The media server 130 can transmit the video streams 112 from the media sources 105 to the video viewing device 150 or may apply filtering by selectively throttling one or more of the video streams 112 before sending to the video viewing device 150.

The media server 130 may include a processor 132 and an associated memory 134 comprising computer-executable program instructions that, when executed by the processor 132, cause the processor 132 to perform various operations. The instructions can be organized in one or more applications, such as a video stream manager application 136. The processor 132 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 134 may be but is not limited to a random access memory (RAM), read only memory (ROM), or other electronic, optical, magnetic or any other computer readable medium.

The video viewing device 150 may be a computing device capable of outputting video to a display 151, such as, for example, a desktop computer, a laptop computing, a tablet computer, a smart phone, a smart watch, or similar computing device known to one of skill in the art. Video viewing device 150 may include a processor 152 and an associated memory 154 comprising computer-executable instructions that, when executed by the processor 152, cause the processor 152 to perform various operations. The instructions can be organized in one or more applications, such as a video display application 156 that can interface with a web browser or be a standalone application. The processor 152 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 154 may be but is not limited to a random access memory (RAM), read only memory (ROM), or other electronic, optical, magnetic or any other computer readable medium.

The network 170 can include a number of network elements known in the art and may be part of a cloud architecture. The network 170 can manage traffic from many sources beyond those depicted in FIG. 1 and may be part of the Internet or an Intranet. The network 170 can include wired, wireless, and/or optical communication links.

In embodiments of the disclosure, the video cameras 110 can capture image frames and transmit the image frames in video streams 112 to the media server 130. The video streams 112 from one or more video cameras 110 can be sent through video recorders 120 and arrive at the media server 130 as one or more incoming streams 122. The image frames of the video streams 112 may be organized into packets 114 by the video cameras 110 or other supporting equipment. The video packets 114 can contain information such as, for example, an IP address from where the video packets 114 are coming from, an IP address where to send the video packets 114, a type of the image frame, a number of image frames, time stamps of each image frame, and video parameters 140 discussed further herein. The video packets 114 can be independently formed by each of the video cameras 110 such that each video packet 114 is associated with one of the video streams 112. Alternatively, portions of two or more of the video streams 112 may be combined within the same video packet 114, for instance, where a data concentrator or other such device (not depicted) is used to gather and send video data to the media server 130. In some embodiments, video packets 114 can be processed, modified, and/or generated by one or more of the video recorders 120. The video packets 114 may be processed by the video stream manager application 136 of the media server 130 and be further transmitted to video viewing device 150. The video packets 114 can be received at the video viewing device 150, decoded, and sent to display 151, which then visually displays the image frames received. The video display application 156 can control, for example, which of the video streams 112 to display at a full frame rate and which of the video streams 112 should be throttled by the video stream manager application 136 of the media server 130, for instance, based on a user selection.

The video stream manager application 136 may use various data sources to determine when to apply throttling to reduce the bandwidth needed for transmitting one or more of the video streams 112 to the video viewing device 150 through the network 170. Throttling can include retaining selected image frames of a video stream 112 and dropping other image frames, such that a sequence of images is still transmitted in a protocol compliant format, but a slower update rate of the images results. Throttling can be commanded based on observed characteristics of the media server 130, the network 170, and/or the video viewing device 150. For example, a user-initiated throttle request detected at the video display application 156 can be sent to the video stream manager application 136 for the video stream manager application 136 to throttle one or more video streams 112 identified by the user-initiated request. The video stream manager application 136 can also monitor characteristics associated with the video streams 112 and performance of the network 170 to initiate throttling when media server 130 initiated throttling is supported or enabled. For example, latency of the network 170 can be monitored by sending periodic requests for responses to the video viewing device 150 and tracking a total time metric between sending the request and receiving the response. Other known network traffic monitoring and performance metrics can also be used to determine an availability or congestion level of the network 170.

In some embodiments of the disclosure, the media server 130 can collect and analyze video parameters 140 of the video streams 112 and/or video packets 114. The video parameters 140 can include statistical information regarding the video streams 112 and/or the video packets 114. The video parameters 140 may include but are not limited to time between image frames, time between video packets 114, a sequential number of image frames, and a sequential number of a video packet 114, a size of the video packet 114, and a real frame per second (FPS) value. The size of the video packet 114 may be used, for example, to calculate frame size and bandwidth to predict the likely impact of selecting one or more associated video streams 112 for throttling.

The video streams 112 and/or video packets 114 can be collected in one or more incoming streams 122 of the media server 130 and buffered in memory 134 of the media server 130. The video stream manager application 136 can collect the video parameters 140 of the incoming streams 122 along a path 50 from the video cameras 110 and video recorders 120. The path 50 between the video cameras 110, video recorders 120, and the media server 130 may be hardwired and/or wireless. In some embodiments, one or more video recorders 120 can be separately coupled to the media server 130 and/or video cameras 110 can be directly coupled to the media server 130 without passing through video recorders 120. The collection of the video parameters 140 can support a quantitative analysis to determine when throttling may be beneficial, such as, for example, a delay of image frames, lost video packets 114, delays in video packet 114 delivery, irregularity in image frame bandwidth, and/or irregularity in image frame delivery.

Although not shown for simplicity, the video cameras 110, video recorders 120, and network 170 may also include at least one processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 2:
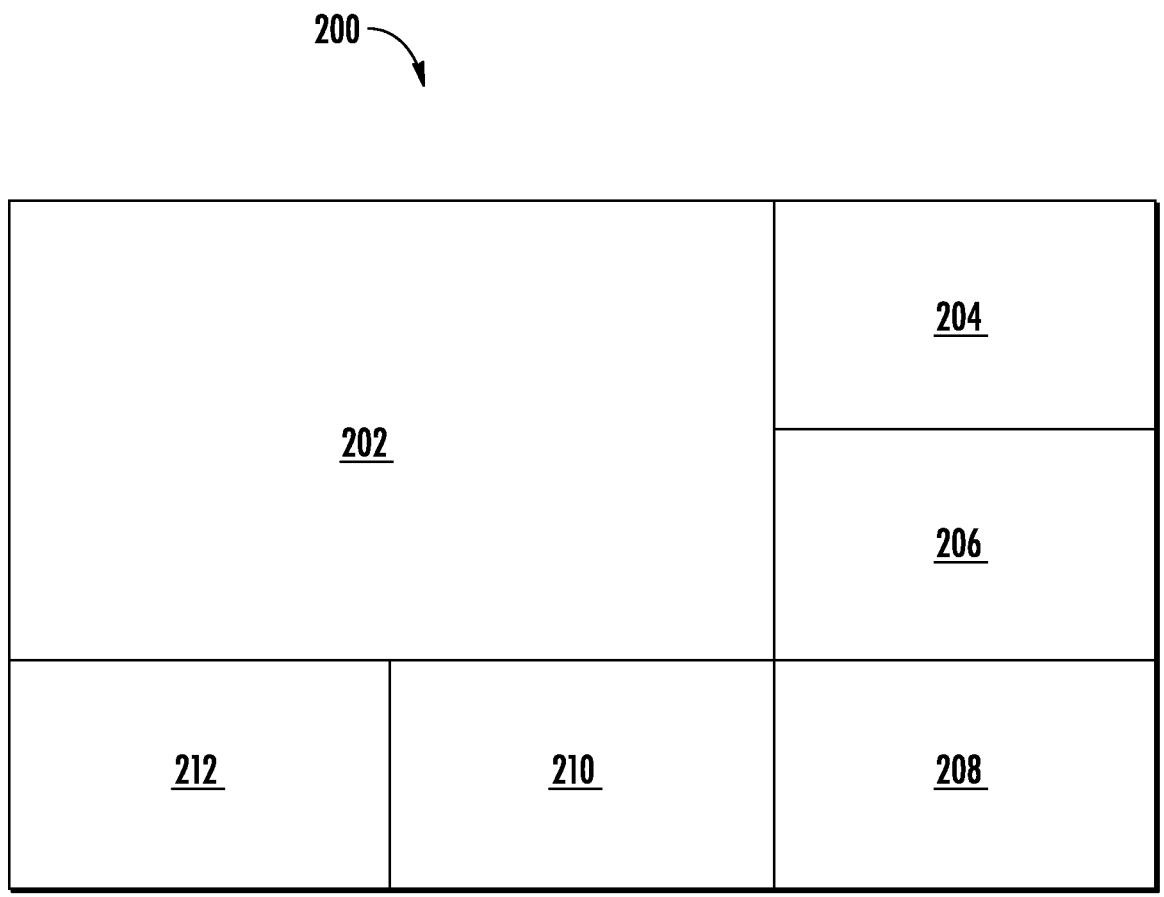
FIG. 2 illustrates a display with multiple video streams, in accordance with an embodiment of the disclosure.

FIG. 2 illustrates an example configuration 200 of the display 151 of FIG. 1 to output multiple video streams 112 of FIG. 1 in parallel. In the example of FIG. 2, six video streams 112 can be output to the display 151 by the video display application 156, for instance, from six instances of the video cameras 110 of FIG. 1 as live video feeds with respect to areas 101 of FIG. 1. A first display location 202 may have a largest viewing area and provide an unthrottled version of a selected video stream 112. Display locations 204, 206, 208, 210, and 212 may have reduced size as compared to the first display location 202. Each of the display locations 202-212 may be associated with a different video camera 110. As one example, the video display application 156 can send a command to the video stream manager application 136 to transmit the video stream 112 associated with the first display location 202 with throttling disabled and to transmit the video streams 112 associated with display locations 204, 206, 208, 210, and 212 with throttling enabled. Thus, all image frames of the video stream 112 associated with the first display location 202 can be transmitted to the video viewing device 150, while secondary frames of the video streams 112 associated with display locations 204-212 can be dropped by the video stream manager application 136 and not be sent to the video viewing device 150. If a user desires to view the video stream 112 associated with display location 210 with greater detail, a selection can be made through the video display application 156 to remap the video stream 112 associated with the first display location 202 to the display location 210 while also requesting throttling of the video stream 112. The video display application 156 can also remap the video stream 112 associated with display location 210 to be output to the first display location 202 and send a throttling disable command to the video stream manager application 136, such that the video stream 112 now associated with the first display location 202 is transmitted without throttling.

It will be understood that many user interface variations can be implemented in exemplary embodiments, and FIG. 2 represents one such example. Further, with respect to FIG. 2, any of the video streams 112 associated with the display locations 202-212 can be independently throttled or throttled in groups depending upon the implementation.

Figure 3:
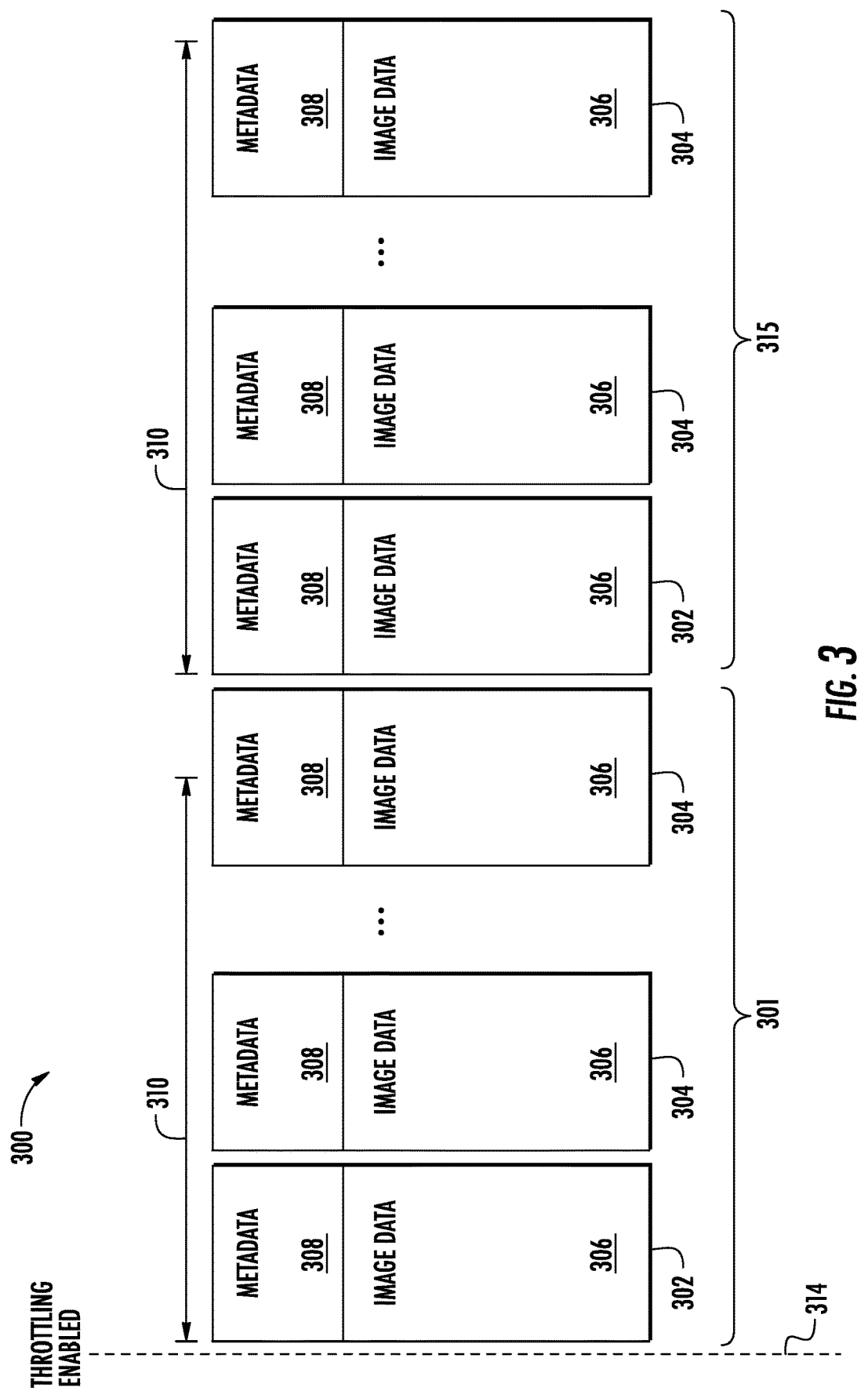
FIG. 3 illustrates a video stream with throttling, in accordance with an embodiment of the disclosure.

FIG. 3 illustrates an example of a video stream 300 with throttling. A first buffer interval 301 can include a plurality of image frames 302, 304 observed while a timer 310 is active and throttling is enabled 314. Using the timer 310 for comparison to a predetermined condition can result in some variability with respect to the number of image frames 302 observed over the first buffer interval 301. The first buffer interval 301 may be a count based on a predetermined number of image frames 302, 304, such as thirty image frames. If the timer 310 is used to observe when a predetermined period of time has elapsed, such as one second, the end condition may not align with a complete instance of an image frame 302, 304. For example, the media server 130 of FIG. 1 may be in the process of receiving an image frame 302, 304 when the timer 310 expires or reaches a predetermine condition. In the example of FIG. 3, image frame 302 is an image frame selected for transmission and image frame 304 is an image frame to be discarded. In some embodiments, the next image frame 302 used to start a next buffer interval 315 is transmitted and all other image frames 304 received during a next period of timer 310 are dropped while throttling is enabled 314. In other embodiments, a last complete image frame or a last partial image frame received at or before the timer 310 reaches a predetermined condition can be used as the image frame 302 to be transmitted while throttling is enabled 314.

The image frames 302, 304 can each include image data 306 (such as a full JPEG image) and metadata 308. The metadata 308 can include, for example, a timestamp, sequence information, encoding information, and other such data. When throttling is disabled, all of the image frames 302, 304 can be transmitted from the media server 130 to the video viewing device 150 of FIG. 1. When throttling is enabled 314, the effective frame rate of the video stream 300 is reduced to about one image frame 302 per time period that aligns with a predetermined condition of timer 310. The predetermined condition can be equivalent to the timer 310 reaching or exceeding a particular value, or in a countdown timer configuration, the predetermined condition could be reaching a predetermined value or a value below the predetermined value.

To further illustrate an example of how the image frames 302 are selected for transmission to the video viewing device 150, the video stream manager application 136 may track status information such as a last transmitted frame timestamp and a count of image frames 304 dropped since the last image frame 302 was identified. For each incoming frame, the video stream manager application 136 can track time since last reaching a predetermined value of the timer 310 and timing with respect to the previous transmission of the image frame 302. If the current time before transmission exceeds the previous time since last reaching a predetermined value of the timer 310, then the currently available image frame 302 can be transmitted. Otherwise, image frames 304 can be dropped until a predetermined condition is reached, and the image frame 302 corresponding to the predetermined condition can be transmitted. In the example of a 30 frame per second rate (1 frame per 33.33 ms), a threshold value for reaching a predetermined condition can be, for example, 966 ms, such that the next image frame 302 after the timer 310 reaches 966 ms is the image frame 302 to be transmitted. Thus, there can be some variability in timing between image frames 302 transmitted while throttling is enabled 314.

Further, when throttling is enabled 314 and video recording to the video recorders 120 of FIG. 1 is active, the full content of the video stream 300 may be recorded, including the image frames 302, 304, since the video recorders 120 are not coupled through the network 170 of FIG. 1. Therefore, if a user is concerned that video details were not available to view at the video viewing device 150 due to throttling, the user could subsequently playback a copy of the video stream 300 recorded by the video recorders 120 without throttling to see the full frame rate details including video frames 304 that would otherwise be dropped due to throttling.

Figure 4:
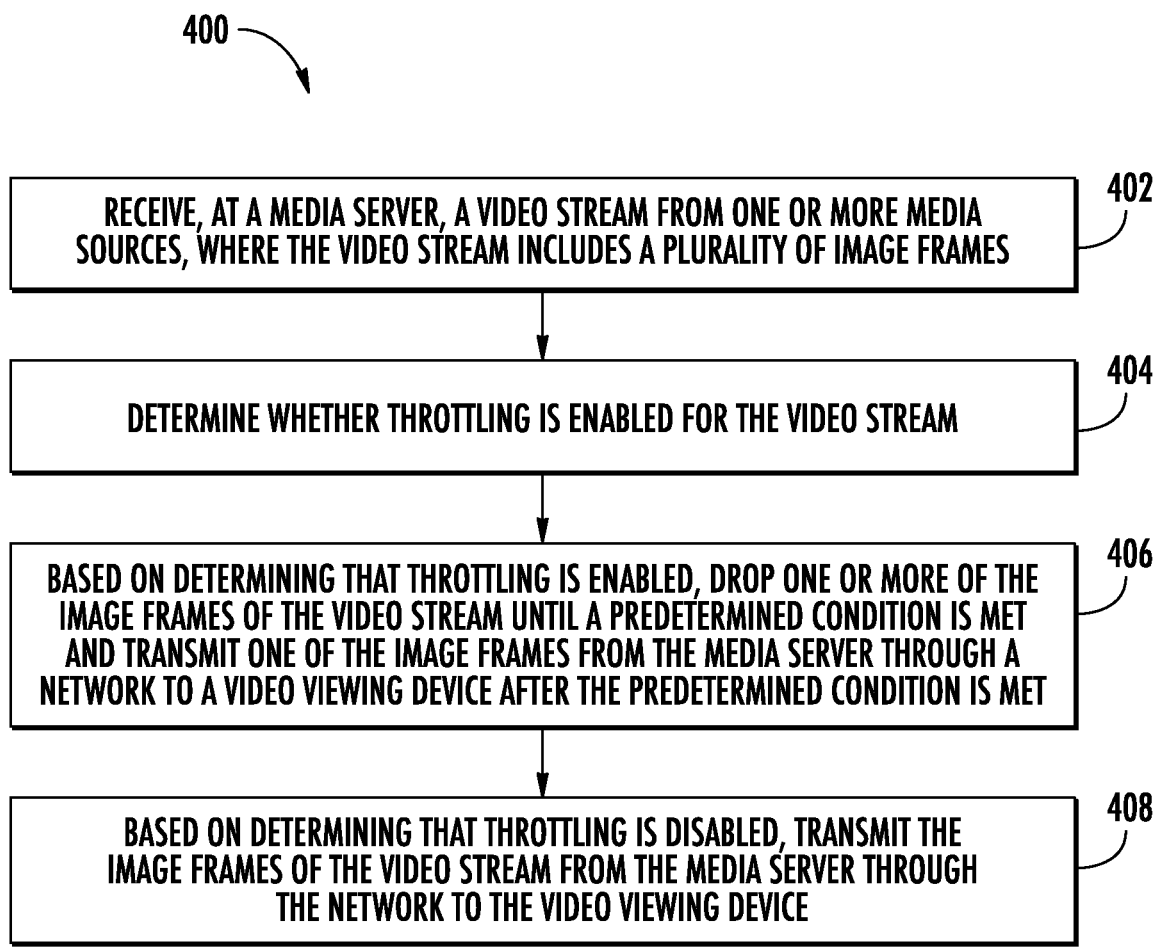
FIG. 4 is a flow diagram illustrating a method, according to an embodiment of the present disclosure.

Referring now to FIG. 4, with continued reference to FIGS. 1-3, a flow chart of method 400 of controlling a video system 100 is illustrated, in accordance with an embodiment of the present disclosure. In an embodiment, the method 400 is performed by the media server 130.

The video stream manager application 136 and the video display application 156 may each be a computer program product embodied on a computer readable medium. The method 400 can be performed by the video stream manager application 136 in conjunction with support provided by the video display application 156. The video stream manager application 136 (i.e., computer program product) may include instructions that, when executed by the processor 132, cause the processor 132 to perform operations comprising method 400. In one embodiment, the computer readable medium where the video stream manager application 136 is stored may be located within the memory 134 of the media server 130. In another embodiment, the computer readable medium where the video stream manager application 136 is stored may be located external to the media server 130 but be readable by the media server 130.

At block 402, the media server 130 receives a video stream 112 from one or more media sources 105, where the video stream 112 includes a plurality of image frames 302, 304, such as video stream 300. The one or more media sources 105 can be one or more of a video camera 110 and a video recorder 120.

At block 404, the media server 130 determines whether throttling is enabled 314 for the video stream 112. Throttling status can be tracked on a per video stream 112 basis, for instance, using a flag or variable stored in memory 134.

At block 406, based on determining that throttling is enabled 314, the media server 130 can drop one or more of the image frames 304 of the video stream 300 until a predetermined condition is met (e.g., with respect to timer 310 and/or a frame count) and transmit one of the image frames 302 from the media server 130 through a network 170 to a video viewing device 150 after the predetermined condition is met.

At block 408, based on determining that throttling is disabled (i.e., throttling is not enabled), the media server 130 can transmit the image frames 302, 304 of the video stream 300 from the media server 130 through the network 170 to the video viewing device 150.

The method 400 may include tracking a time and a number of frame drops since a last frame was transmitted while throttling is enabled 314, where the predetermined condition can be based on one or more of the time and the number of frame drops since the last frame was transmitted. The one or more media sources 105 can provide a plurality of video streams 112 to the media server 130, and throttling can be selectable on a per video stream 112 basis. Throttling can be commanded in response to a throttling request received from the video viewing device 150. Further, throttling can be commanded based on a status of the network 170. In some embodiments, throttling can be commanded based on a status of the media server 130.

Figure 5:
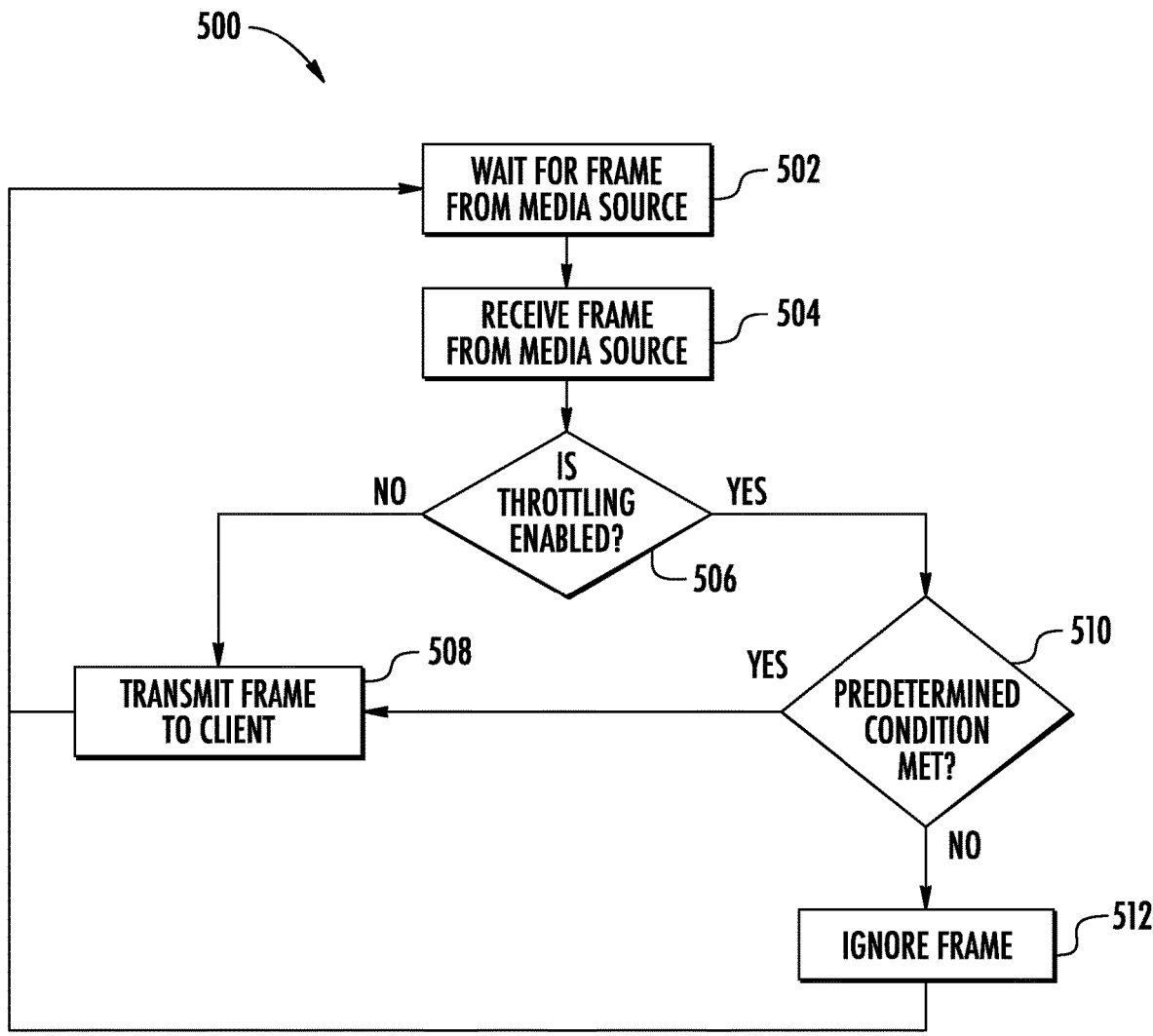
FIG. 5 is a flow diagram illustrating a method, according to an embodiment of the present disclosure.

FIG. 5 depicts a further example of a method 500 for controlling the video system 100 of FIG. 1. FIG. 5 is described with respect to FIGS. 1-4 and may be performed by the video stream manager application 136. At block 502, the media server 130 can wait for a frame from a media source 105. At block 504, the media server 130 receives a frame from the media source 105. At block 506, the media server 130 determines whether throttling is enabled 314. If throttling is not enabled at block 508, the media server 130 can transmit the fame (e.g., image frame 302, 304) to the video viewing device 150 and the flow returns to block 502. If throttling is enabled 314 at block 506, the media server 130 determines whether a predetermined condition has been met at block 510. As previously described, the predetermined condition can be time-based, frame count based, or based on a combination of conditions to identify when an image frame 302 should be selected for transmission. If the predetermined condition is met at block 510, then flow proceeds to block 508 to transmit the frame as image frame 302. If the predetermined condition is not met at block 510, then at block 512 the frame is ignored/dropped and flow returns to block 502.

By selectively delivering image frames 302 at a reduced rate, the resulting video stream is still MJPEG compliant but reduces the bandwidth without transcoding and reduces the resource utilization of the video viewing device 150. While the above description has described the flow processes of FIGS. 4 and 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a computer readable storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A video system comprising:
one or more media sources; and
a media server configured to communicate with a video viewing device through a network, the media server comprising memory and a processor configured to perform a plurality of operations comprising:
receiving a plurality of video streams from the one or more media sources, wherein each of the video streams comprises a plurality of image frames;
determining whether throttling is enabled for each of the video streams, wherein throttling is selectable on a per video stream basis and in response to a throttling request received from the video viewing device;
based on determining that throttling is enabled for one or more selected video streams of the plurality of video streams, dropping one or more of the image frames of the one or more selected video streams until a predetermined condition is met and transmitting one of the image frames from the media server through the network to the video viewing device to display the one of the image frames at a reduced frame rate after the predetermined condition is met; and
based on determining that throttling is disabled, transmitting the image frames of the video stream from the media server through the network to the video viewing device to display the image frames of the video streams at a full-frame rate.

2. The video system of claim 1, wherein the operations further comprise:
tracking a time and a number of frame drops since a last frame was transmitted while throttling is enabled, wherein the predetermined condition is based on one or more of the time and the number of frame drops since the last frame was transmitted.

3. The video system of claim 1, wherein all image frames of one of the video streams associated with a first display location are transmitted to the video viewing device, while a plurality of secondary frames of the video streams associated with one or more display locations having a reduced size as compared to the first display location are dropped.

4. The video system of claim 1, wherein throttling is commanded based on a status of the network.

5. The video system of claim 1, wherein throttling is commanded based on a status of the media server.

6. The video system of claim 1, wherein the one or more media sources comprise one or more of a video camera and a video recorder.

7. A method of controlling a video system, the method comprising:
receiving, at a media server, a plurality of video streams from one or more media sources, wherein each of the video streams comprises a plurality of image frames;
determining whether throttling is enabled for each of the video streams, wherein throttling is selectable on a per video stream basis and in response to a throttling request received from the video viewing device;

based on determining that throttling is enabled for one or more selected video streams of the plurality of video streams, dropping one or more of the image frames of the one or more selected video streams until a predetermined condition is met and transmitting one of the image frames from the media server through a network to a video viewing device to display the one of the image frames at a reduced frame rate after the predetermined condition is met; and based on determining that throttling is disabled, transmitting the image frames of the video streams from the media server through the network to the video viewing device to display the image frames of the video streams at a full-frame rate.

8. The method of claim 7, further comprising:
tracking a time and a number of frame drops since a last frame was transmitted while throttling is enabled, wherein the predetermined condition is based on one or more of the time and the number of frame drops since the last frame was transmitted.

9. The method of claim 7, wherein all image frames of one of the video streams associated with a first display location are transmitted to the video viewing device, while a plurality of secondary frames of the video streams associated with one or more display locations having a reduced size as compared to the first display location are dropped.

10. The method of claim 7, wherein throttling is commanded based on a status of the network.

11. The method of claim 7, wherein throttling is commanded based on a status of the media server.

12. The method of claim 7, wherein the one or more media sources comprise one or more of a video camera and a video recorder.

13. A computer program product for controlling a video system, the computer program product comprising a computer readable storage medium having program instructions embodied therewith, the program instructions executable by a processor of a media server to cause the processor to perform:

receiving a plurality of video streams from one or more media sources, wherein each of the video streams comprises a plurality of image frames;

determining whether throttling is enabled for each of the video streams, wherein throttling is selectable on a per video stream basis and in response to a throttling request received from the video viewing device;

based on determining that throttling is enabled for one or more selected video streams of the plurality of video streams, dropping one or more of the image frames of the one or more selected video streams until a predetermined condition is met and transmitting one of the image frames from the media server through a network to a video viewing device to display the one of the image frames at a reduced frame rate after the predetermined condition is met; and based on determining that throttling is disabled, transmitting the image frames of the video stream from the media server through the network to the video viewing device to display the image frames of the video streams at a full-frame rate.

14. The computer program product of claim 13, wherein the program instructions are executable by the processor perform:

tracking a time and a number of frame drops since a last frame was transmitted while throttling is enabled, wherein the predetermined condition is based on one or more of the time and the number of frame drops since the last frame was transmitted.

15. The computer program product of claim 13, wherein all image frames of one of the video streams associated with a first display location are transmitted to the video viewing device, while a plurality of secondary frames of the video streams associated with one or more display locations having a reduced size as compared to the first display location are dropped.

16. The computer program product of claim 13, wherein throttling is commanded based on a status of the network.

17. The computer program product of claim 13, wherein throttling is commanded based on a status of the media server.

* * * * *